(12) United States Patent
Wanjek et al.

(10) Patent No.: US 8,558,861 B2
(45) Date of Patent: Oct. 15, 2013

(54) DEVICE AND METHOD FOR RECORDING INFORMATION IN A DATA CARRIER

(75) Inventors: Michael Wanjek, Nittenau (DE); Axel Schwarzmeier, Selb (DE)

(73) Assignee: Muehlbauer AG, Roding (DE)

( * ) Notice: Subject to any disclaimer, the term of this patent is extended or adjusted under 35 U.S.C. 154(b) by 683 days.

(21) Appl. No.: 12/514,041

(22) PCT Filed: Oct. 26, 2007

(86) PCT No.: PCT/EP2007/061527
§ 371 (c)(1),
(2), (4) Date: May 7, 2009

(87) PCT Pub. No.: WO2008/055791
PCT Pub. Date: May 15, 2008

(65) Prior Publication Data
US 2009/0321400 A1 Dec. 31, 2009

(30) Foreign Application Priority Data
Nov. 7, 2006 (DE) .......................... 10 2006 052 380

(51) Int. Cl.
*B41J 27/00* (2006.01)

(52) U.S. Cl.
USPC ........................... 347/260; 347/241; 347/259

(58) Field of Classification Search
USPC ........................................ 347/241, 259, 260
See application file for complete search history.

(56) References Cited

U.S. PATENT DOCUMENTS

| 3,256,524 A | * | 6/1966 | Stauffer ..................... 346/107.4 |
| 4,272,192 A | * | 6/1981 | Matsuda ....................... 356/458 |
| 6,172,788 B1 | * | 1/2001 | Suzuki et al. .............. 359/204.1 |
| 6,424,366 B1 | * | 7/2002 | Probian et al. ................ 347/156 |
| 2003/0102289 A1 | | 6/2003 | Nissels et al. |
| 2006/0139441 A1 | * | 6/2006 | Ono et al. ..................... 347/233 |

FOREIGN PATENT DOCUMENTS

| DE | 3634865 | 6/1987 |
| DE | 10007391 | 5/2001 |
| DE | 19949945 | 8/2001 |
| DE | 10147037 | 4/2003 |
| EP | 0216947 | 4/1987 |
| EP | 1705600 | 9/2006 |

* cited by examiner

*Primary Examiner* — Stephen Meier
*Assistant Examiner* — Sarah Al Hashimi
(74) *Attorney, Agent, or Firm* — John A. Miller; Miller IP Group, PLC

(57) ABSTRACT

A method and a device for recording information within an information surface region in a data carrier, consisting of a carrier layer and a transparent plastic layer, by means of at least one laser beam of a point-like laser source wherein the laser beam is deflected via at least one deflection surface, in particular a mirrored surface before it impinges on the data carrier, wherein the at least one deflection surface is arranged in a region between the laser source and the data carrier and outside an intermediate region bounded by notional straight connection lines between the laser source and edge regions of the information surface region.

11 Claims, 2 Drawing Sheets

DEVICE AND METHOD FOR RECORDING INFORMATION IN A DATA CARRIER

PRIORITY CLAIM

This is as national phase application of PCT/EP2007/061527 filed Oct. 26, 2007 which claims priority to German Application Serial No. 10 2006 052 380.6 filed Nov. 7, 2006, contents of which are incorporated herein.

FIELD OF THE INVENTION

The invention relates to a device and a method for recording information within an information surface region in a data carrier, more particularly consisting of a carrier layer and a transparent plastic layer and at least one laser beam of a point-like laser source.

BACKGROUND

Data carriers, such as e.g. identification cards, credit cards, bank cards, cash payment cards and the like, are increasingly being used in a wide range of service sectors, for example in cashless payment transactions and in in-house applications. As a result of their widespread use, they are a typical mass-produced article. The production thereof, i.e. the manufacture of the card structure and the recording of the card-specific user data, must be easy and cost-effective.

On the other hand, the cards must be designed in such a way that they are protected as far as possible against forgery and falsification.

The many types of identification cards already on the market and still in the development stage demonstrate that considerable efforts have been made in this regard.

EP 0 216 947 B1 discloses methods for laser processing systems for producing animated image effects on laminated composites and for producing optical illusions. In such methods, a polycarbonate film composite composed of a plurality of thin films with security prints located therebetween is produced by means of lamination in the customary credit card format.

An inscription or a different type of information is written into the card composite by means of a laser beam. In this case, an upper side of the card is provided with a so-called lens grid in a hot-melt process in a thermal transfer press. The upper edge of the lens grid is preferably arranged in one plane with the card body, so that a certain care is taken of the lens surface.

Through the lenses of the lens grid which are thus formed, a laser beam is then deflected at an oblique orientation with respect to the card surface, said beam being focussed in the region of the respective lens and being deflected onto a specific inner plane of the card. Defined areas of blackening are produced in this plane. In this way, at least two authenticity features which are dependent on the observer's viewing direction can be written into the card.

Cards produced in this way disadvantageously require the necessary production step of moving and tilting the card and/or the laser in order to allow the irradiation at different angles so as to produce an optical illusion. Such data carriers are time-consuming and costly to produce. Moreover, imprecise relief-based optical illusions are produced due to the movement processes of at least a plurality of components.

SUMMARY

The present invention is to providing a device and a method for recording information in a data carrier, which allows a quick and easy incorporation of a relief-based optical illusion field in the data carrier with relatively high precision by means of at least one laser beam.

In one embodiment of the present invention is directed towards a device for recording information within an information surface region in a data carrier, consisting of a carrier layer and a transparent plastic layer, by means of at least one laser beam of a point-like laser source, there is provided at least one deflection surface, preferably a mirrored surface, for deflecting, preferably reflecting, the laser beam before it impinges on the data carrier, wherein the at least one mirrored surface is arranged in a region between the laser source and the data carrier and outside an intermediate region bounded or defined by notional straight connection lines between the laser source and edge regions of the information surface region. In this way, there is no need for the laser source to be displaced back and forth above a surface of the data carrier or, with the laser source stationary, for the card or data carrier located therebelow to be displaced back and forth. Moreover, a partial or complete shading of the information surface region in which a relief-based optical illusion to be incorporated is arranged, such as an inscription field for example, is prevented. This allows a quick and cost-effective incorporation of the relief-based optical illusion with high precision, including with regard to the spatial resolution.

In addition, it is advantageously possible to target any position on the information surface region by suitably orienting the mirrored surfaces, which are arranged on preferably planar mirror elements.

As an alternative or in addition, surfaces of prisms may be used as deflection surfaces which deflect the laser beam instead of reflecting it.

If the laser beam of the laser source were not reflected or deflected by such mirrors so as to impinge on the information surface region, the radiation cone of the laser beam would be provided with a base surface in the region of the plane of the data carrier which is larger than the actual information surface region.

Two mirrored surfaces, which are located opposite one another with respect to the intermediate region and which are inclined towards the information surface region of the data carrier, are preferably provided. In this way, the laser beams can impinge on the surface of the data carrier from two different directions in order to produce relief-based optical illusions.

Two or more mirrored surfaces may be arranged one behind the other along a connection line in order to allow a multiple deflection of the laser beams and if necessary a simultaneous processing of a plurality of relief-based optical illusion field components.

The mirrored surface is preferably mounted such that it can pivot about an axis extending parallel to the surface plane of the data carrier and/or about an axis extending perpendicular to the surface plane of the data carrier. This allows a tilting of the mirrored surface and a fixed setting of a certain tilt angle of the mirrored surface relative to the horizontal or the vertical so as to form the relief-based optical illusion. Of course, during the application of the laser beam(s) to the surface of the data carrier, the tilt angle may be varied in order to allow a continuous processing of individual sections of the relief-based optical illusion field.

At the same time or as an alternative, the distance between the mirrored surface and the surface of the data carrier can be varied in order thus to reach a predefinable position on the information surface region by means of the deflected laser beam with the desired light intensity.

According to one preferred embodiment, at least two laser beams reflected by different mirrored surfaces are directed onto the information surface region from different directions in order to produce the relief-based optical illusion field or an optical illusion. To this end, the mirrored surfaces are designed in such a way that they impinge on a common position on the surface of the data carrier in order to produce the optical illusion.

In the method according to the invention, advantageously the at least one laser beam is deflected via at least one mirrored surface before it impinges on the data carrier, in such a way that it impinges on the surface of the data carrier without a mirrored surface being disruptively arranged between the laser source and the surface of the data carrier.

Further advantageous embodiments will emerge from the dependent claims.

BRIEF DESCRIPTION OF THE DRAWING

Advantages and expedient features can be found in the following description in conjunction with the drawing, in which.

DETAILED DESCRIPTION OF THE INVENTION

Figure 1:
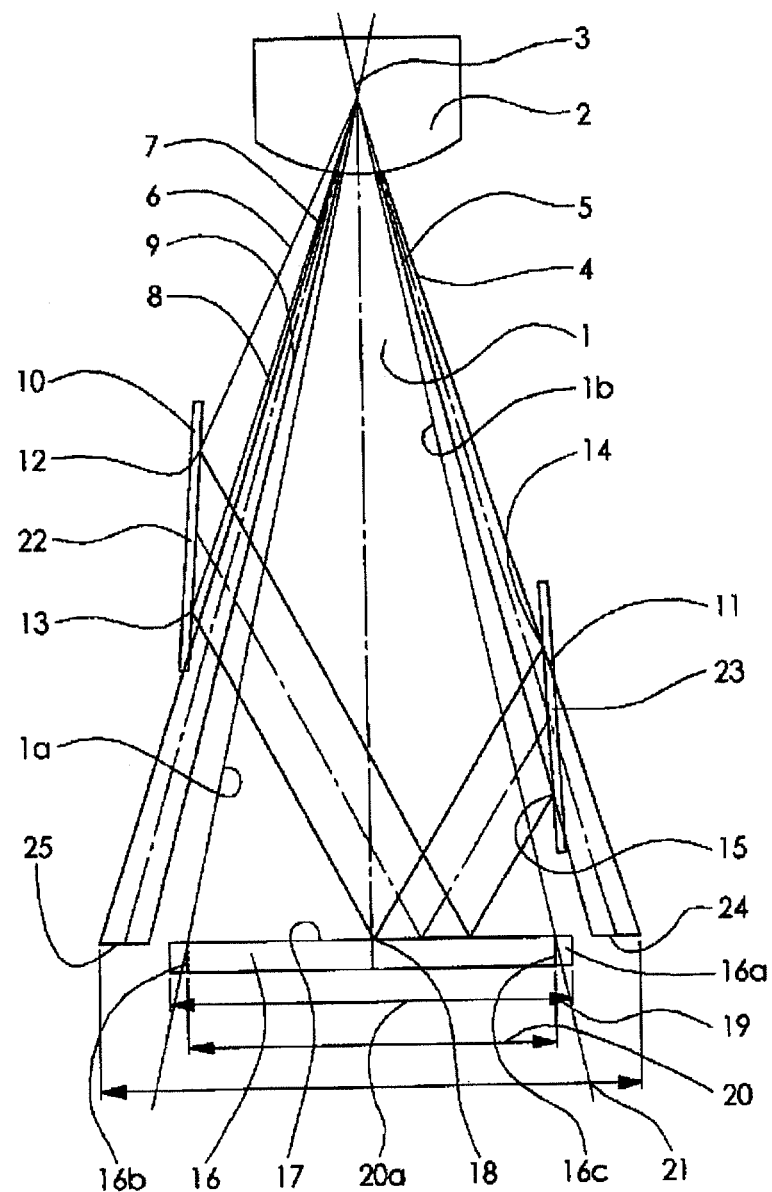
FIG. 1 shows a schematic view of the device according to a first embodiment of the invention.

In FIG. 1, a laser source 2 which emits at least one laser beam in a point-like manner at a point 3 is arranged in such a way that it encloses with the information surface region 16 an intermediate region 1 which is bounded by connection lines 1a and 1b which connect the point-like laser source 2, 3 to edge regions 16b, 16c of an information surface region 16 of a data carrier 16a. Here, the intermediate region 1 is of triangular shape in this diagram.

Unlike the laser beams 8, 9, the laser beams 4, 5 and 6, 7 are reflected at bending surfaces 10, 11 at the points 12, 13, 14 and 15 in such a way that they impinge from different directions on a surface 17 of the data carrier 16a and of the information surface region 16 at the points 18, 19. As a result, a relief-based optical illusion field containing optical illusion phenomena can be produced.

The information surface region 16 has a size 20 which is smaller than a size 21 of a laser field that would be obtained if the laser beam(s) were not deflected by mirrored surfaces. This is also illustrated by the surfaces 24, 25 generated by non-deflected laser beams.

The mirrors or mirrored surfaces can be pivoted about pivot axes 22, 23 arranged parallel to the surface of the data carrier 16a in such a way that they have different angles of inclination relative to the surface of the data carrier 16a in order to reach different positions of the information surface region 16 with the deflected laser beams.

Figure 2:
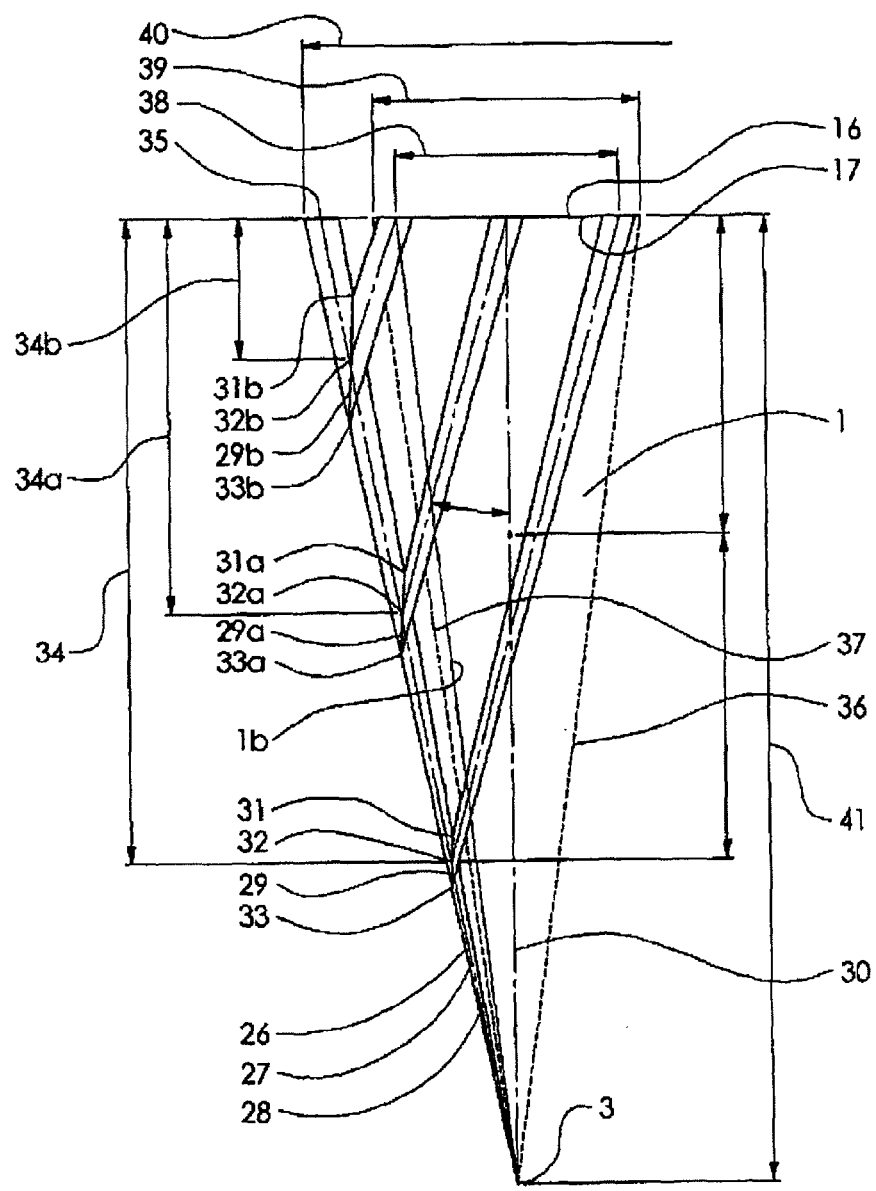
FIG. 2 shows a schematic view of the device according to a second embodiment of the invention.

FIG. 2 shows a schematic view of the device of the invention according to a second embodiment of the invention. In this device, it is shown that a mirror 29, at which laser beams 26, 27, 28 are reflected, may be arranged at different distances 34, 34a and 34b from the surface 17 of the data carrier 16a. This is illustrated by references 29, 29a and 29b.

At the different positions, the mirror 29, 29a and 29b has the reflection points 31, 32, 33 and 31a, 32a, 33a and 31b, 32b, 33b.

Preferred distances from the surface 17 of the data carrier 16a are approximately 300 mm for the distance 34, approximately 150-200 mm for the distance 34a and 30-80 mm for the distance 34b.

Reference 30 denotes the centre line of a laser beam cone.

The field 35 shows the surface of an impinging laser beam outside the information surface region 16 in the non-deflected or non-reflected state.

A laser field 39 in the plane of the data carrier 16a is illustrated by the lines 36, 37. This laser field 39 is larger than an inscription field 38 or the information surface region 16 having the size 38.

Reference 40 denotes a further laser surface region. The point-like laser source 2, 3 is at a distance 41 of for example 400-600 mm from the surface of the data carrier 16a.

All of the features disclosed in the application documents are claimed as essential to the invention in so far as they are novel individually or in combination with respect to the prior art.

The embodiments of the invention in which an exclusive property or privilege is claimed are defined as follows:

1. A device for printing information onto an information surface region of a data carrier consisting of a carrier layer and a transparent plastic layer, wherein the device utilizes at least one laser beam of a point-like laser source to mark the carrier layer, and comprises at least two deflection surfaces for deflecting the laser beam before it impinges on the data carrier, wherein the at least two deflection surfaces are arranged in a region between the laser source and the data carrier and outside an intermediate region defined by notional straight connection lines between the laser source and edge regions of the information surface region, wherein the information surface region is located on a single face of the data carrier and the deflection surfaces are arranged so that the laser beam impinges the information surface region from different directions to produce a relief-based optical illusion field.

2. The device according to claim 1, comprising at least two deflection surfaces located opposite one another with respect to the intermediate region and which are inclined towards the information surface region of the data carrier.

3. The device according to claim 1, wherein the at least two deflection surfaces comprise two mirrored surfaces arranged one behind the other along one of the connection lines.

4. The device according to claim 1, wherein the at least one deflection surface is pivotable about an axis extending parallel to a surface plane of the data carrier.

5. The device according to claim 4, wherein the distance of the at least one deflection surface form the surface of the data carrier is variable.

6. The device according to claim 1, comprising at least two laser beams reflected by at least two deflection surfaces onto the information surface region from different directions in order to produce an optical illusion.

7. The device according to claim 1, wherein the at least one deflection surface comprises the surfaces of a prism.

8. A method for printing information onto an information surface region of a data carrier consisting of a carrier layer and a transparent plastic layer, the method utilizing at least one laser beam of a point-like laser source to mark the carrier layer, comprising deflecting the laser beam via at least two deflection surfaces before it impinges on the data carrier, wherein the at least two deflection surfaces are arranged in a region between the laser source and the data carrier and outside an intermediate region bounded by notional straight connection lines between the laser source and the edge regions of the information surface region, wherein the information surface region is located on a single face of the data carrier and the deflection surfaces are arranged so that the laser beam impinges the information surface region from different directions to produce a relief-based optical illusion field.

9. The device according to claim 1, wherein the at least one deflection surface comprises a mirrored surface.

10. The device according to claim 1, wherein the at least one deflection surface is pivotable about an axis extending perpendicular to a surface plane of the data carrier.

11. The method according to claim 8, wherein the at least one deflection surface comprises a mirrored surface.

\* \* \* \* \*